United States Patent [19]

Takahashi et al.

[11] Patent Number: 5,257,735

[45] Date of Patent: Nov. 2, 1993

[54] AUTOMATIC ROOM ENVIRONMENT CONTROLLER

[75] Inventors: Junichi Takahashi; Hironobu Nakamura, both of Gifu, Japan

[73] Assignee: Mitsubishi Denki Kabushiki Kaisha, Tokyo, Japan

[21] Appl. No.: 950,327

[22] Filed: Sep. 24, 1992

[30] Foreign Application Priority Data

Sep. 24, 1991 [JP] Japan .................. 3-243339

[51] Int. Cl.$^5$ .............................................. B60H 1/20
[52] U.S. Cl. .................... 236/44 A; 62/229; 236/78 R
[58] Field of Search .............. 236/78 R, 1 R, 44 A, 236/94; 62/126, 229; 165/11.1

[56] References Cited

U.S. PATENT DOCUMENTS 5,042,264 8/1991 Dudley .......................... 62/126

FOREIGN PATENT DOCUMENTS 2019046 10/1979 United Kingdom ............... 236/1 R

Primary Examiner—William E. Wayner

[57] ABSTRACT

An automatic room environment controller which avoids the unnecessary improving operation for the room environment, the controller comprising: member for detecting condition of room environment; member for improving means for improving the condition of the room environment; first member for comparing a value of the condition previously detected by the detecting means with a first predetermined value to determine whether operation of the improving means is necessary or not, so that the operation of the improving means is continued until the condition is improved to the first predetermined value when the necessity of the operation of the improving means; second member for comparing a value of the condition detected at present by the detecting means with the previously detected value of the condition to determine whether the condition corresponding to the value detected at present is improved than the condition corresponding to the previously detected value or not, when the condition corresponding to the value detected at present is not improved, to stop the operation of the improving means.

11 Claims, 9 Drawing Sheets

20 ENVIRONMENT DETECTION PORTION
21
22 ENVIRONMENT IMPROVING EQUIPMENT

FIG. 18
PRIOR ART

AUTOMATIC ROOM ENVIRONMENT CONTROLLER

BACKGROUND OF THE INVENTION

The present invention relates to an automatic room environment controller for improving environment in a room responding to variations of the environment in the room.

Figure 17:
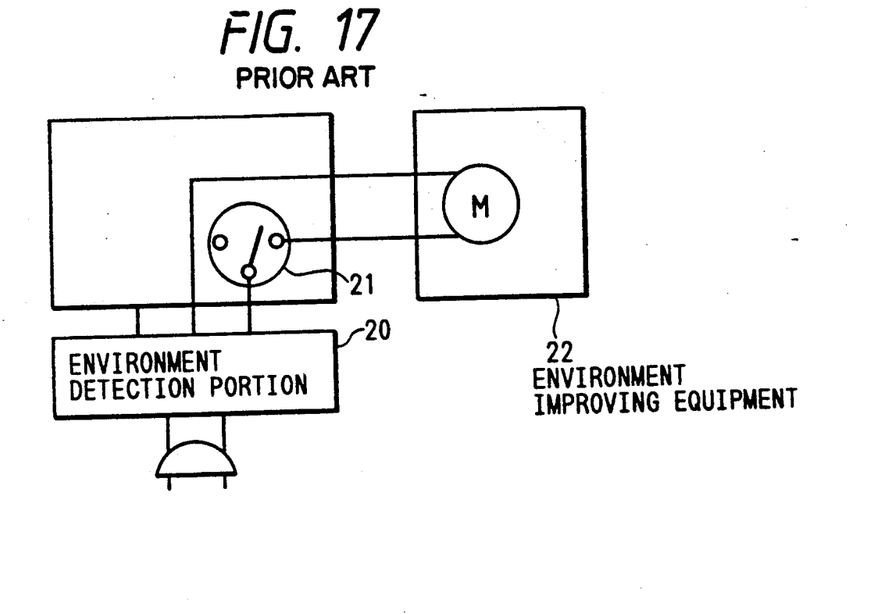
FIG. 17 is a block diagram showing a conventional example.

In order to form comfortable environment in a room, generally, it is necessary to control the quantity of condition affecting to the room environment, this is subject under the control, within a predetermined level. As a conventional controller for improving room environment, there is an arrangement as shown in FIG. 17, for example, disclosed in Japanese Utility Unexamined Publication No. Hei-1-58026. That is, the controller has an environment detecting portion 20 for detecting the quantity of condition affecting the room environment and for quantifying the detected quantity to output thereof, so that the controller causes room environment improving equipments 22 to operate or stop through a switch 21 which is turned on/off in accordance with the output of the environment detection portion 20.

Figure 18:
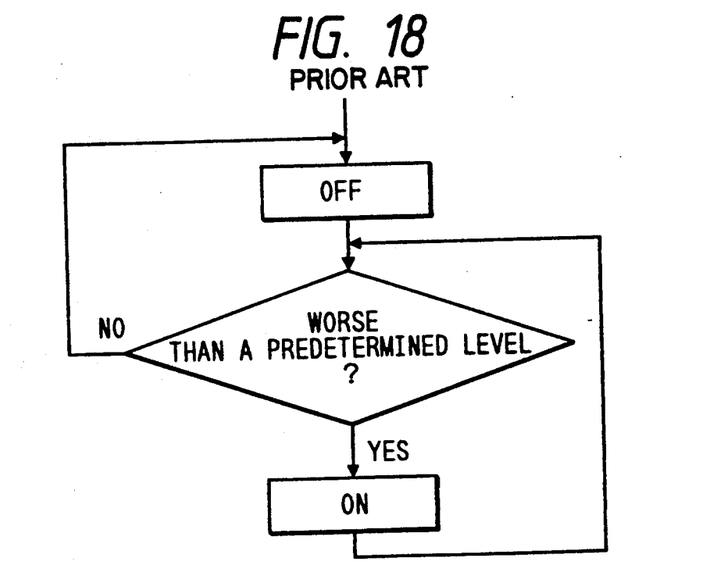
FIG. 18 is a flowchart showing the operation of the conventional example.

In the foregoing conventional controller, as shown in a control flow chart of FIG. 18, if the quantity of condition concerning room environment exceeds a predetermined value, the switch 21 is turned on in accordance with the output of the environment detection portion 20 so that the room environment improving equipments 22 cause the quantity of condition to reach the predetermined value. That is, the room environment improving equipments 22 are controlled to use a predetermined value as a target value.

The conventional controller as described above, however, has a problem to be solved in that since the operation of the room environment improving equipments 22 are controlled according as the quantity of conditions affecting the room environment reaches a predetermined value or not, the room environment improving equipments 22 may continue ineffective operation, even if the room environment cannot be improved by specific one of the room environment improving equipments 22 or even if the room environment becomes rather worse by the specific one of the room environment improving equipments 22.

SUMMARY OF THE INVENTION

An object of the present invention is to provide an automatic room environment controller to prevent unnecessary operation of the room environment improving equipments to be able to effectively improve the room environment.

An automatic room environment controller according to a first invention comprises an environment detection portion for measuring room environment and for outputting the measurement result, a memory for storing the measurement result of the environment detection portion, and a control portion. The control portion operates room environment improving equipment when the measurement result of the environment detection portion become worse than a set level, and compares the room environment before a predetermined time and stored in the memory with the room environment at present during operation of the room environment improving equipment to thereby judge whether there is an improvement in room environment or not so that the control portion causes the room environment improving equipment to continue its operation until the room environment is improved to a set level when there is an improvement in room environment, while the control portion stops the room environment improving equipment operating for a predetermined time when there is no improvement.

In the automatic room environment controllers according to the second, third, and fourth aspects of the invention, a room temperature, humidity, and the degree of air pollution are specified as the room environment respectively, and therefore each of the automatic room environment controllers according to the second, third, and fourth inventions has a detection portions and room environment improving equipment corresponding the specified room environment.

In the automatic room environment controller according to the invention, the room environment is detected by the environment detection portion, the result thus detected is judged in the control portion and stored in the memory. When the detected result becomes worse than a set level, the room environment improving equipments are operated. While the room environment improving equipments are operated, the room environment at a period of time ago is compared with the present environment and it is determined whether the room environment is improved or not. If it is determined that the room environment is improved, the operation of the room environment improving equipments are continued until the room environment is improved to the set level. If it is determined that the room environment is not improved, on the contrary, the operation of the room environment improving equipments are stopped for a period.

In the automatic room environment controllers regarding the second, third and fourth aspects of the invention, effects of the operation of the room environment improving equipments are determined with respect to a room temperature, humidity, and the degree of air pollution respectively, and when no effects exist, the operation of the room environment improving equipments are stopped for a period.

DETAILED DESCRIPTION OF THE PREFERRED EMBODIMENTS

Figure 1:
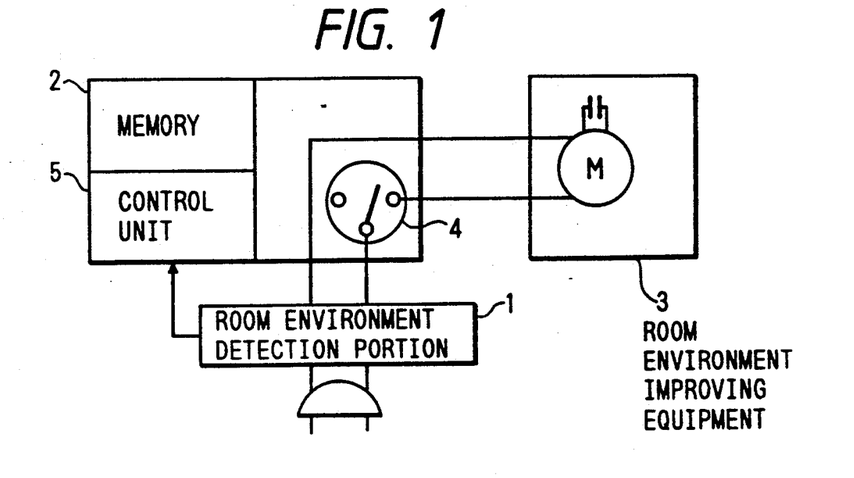
FIG. 1 is a block diagram showing the automatic room environment controller according to first embodiment.
Figure 2:
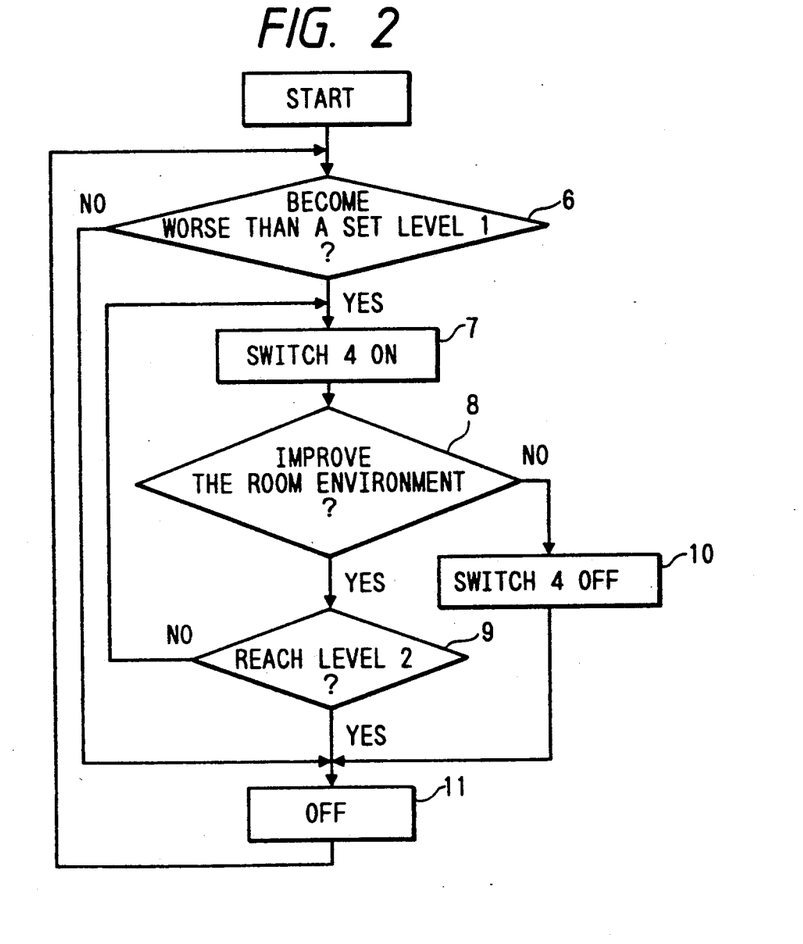
FIG. 2 is a flowchart showing the program for the control portion according to first embodiment.
Figure 3:
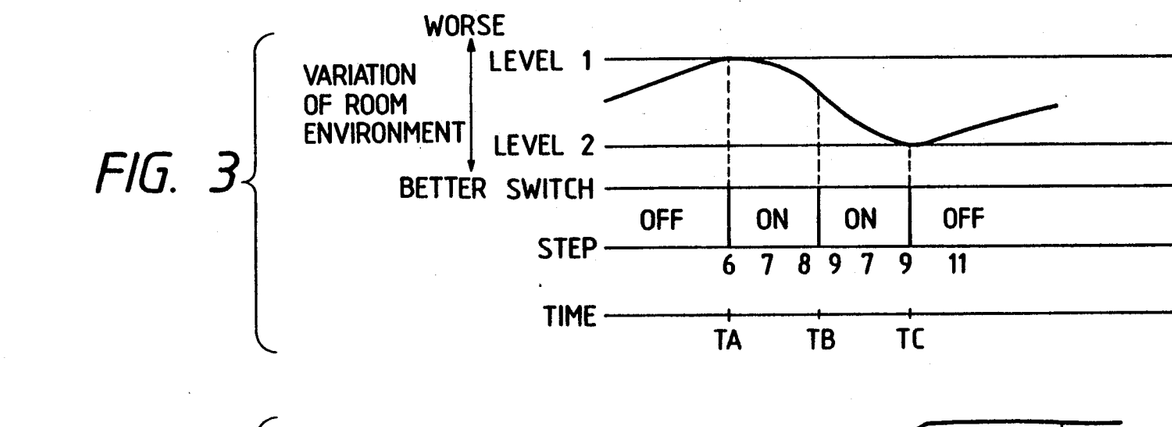
FIG. 3 is a time chart showing the operation of the controller according to first embodiment.
Figure 4:
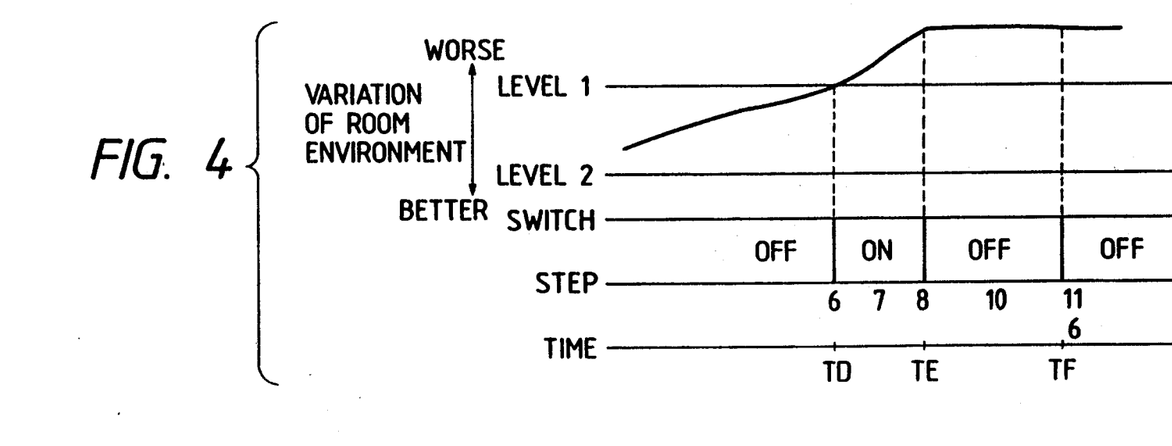
FIG. 4 is a time chart showing the operation of the controller according to first embodiment.

FIGS. 1 through 4 show an embodiment of the present invention. FIG. 1 is a block diagram showing an automatic room environment controller, FIG. 2 is a flow chart showing the program for a control portion, and FIGS. 3 and 4 are time charts showing examples of the operation of the automatic room environment controller.

The automatic room environment controller according to this embodiment shown in the drawings is constituted by a room environment detection portion 1 for detecting room environment and for quantifying the detected value as the quantity of condition to output thereof; a memory 2 for storing the room environment thus detected; and a control portion 5 for generating a control output for room environment improving equipment 3 so as to control the room environment improving equipment 3 through a switch 4. The room environment detection portion 1 varies in accordance with the room environment to be controlled, and further the room environment improving equipment 3 function in accordance with the room environment to be improved.

The program for the control portion 5 of the automatic room environment controller thus arrangement is such as shown in FIG. 2. That is, in Step 6 it is determined whether the detection result of the room environment detection portion 1 becomes worse than a set level 1 or not, and if it is determined that the detection result becomes worse than the level 1, Step 7 is activated, so that the switch 4 is turned on so as to operate the room environment improving equipment 3. While the room environment improving equipment 3 are being operated, data stored in the memory 2 with respect to the room environment at a period time ago are read out, and the read-out data are compared with the data concerning the room environment at present to thereby determine whether the room environment tends to be improved by the operation of the room environment improving equipment or not in Step 8. If the judgment proves that the environment tends to be improved, Step 9 is activated so that the operation of the room environment improving equipment 3 is continued until the room environment is improved to a set level 2. If it is determined that the environment is not improved, on the contrary, the the room environment improving equipment 3 is stopped operating for a period of time in Step 10 and the operation is returned to Step 6 through Step 11. In Step 9, it is determined whether the room environment reaches the level 2 or not, so that in the case where the room environment does not reach the level 2, Step 7 is activated, and, otherwise, Step 11 is activated.

In the time chart of FIG. 3, since it is detected at TA that the room environment has become worse than the set level 1 in Step 6, the switch 4 is turned on for a period of time in Step 7. Then, since it is detected at TB that the room environment has been improved in Step 8, Step 9 is activated. However, since the room environment does not reach the level 2, the operation is returned to Step 7 again so that the switch 4 is turned on for a period of time. Then, since the room environment reaches the level 2 at TC in Step 9, the operation is returned to Step 6 through Step 11. In the time chart of FIG. 4, since the room environment has become worse than the set level 1 at TD in Step 6, the switch 4 is turned on for a period of time, while since the room environment is not improved at TE in Step 8, the switch 4 is turned off for a predetermined time in Step 10. That is, the room environment improving equipment 3 is stopped operating because the operation of the room environment improving equipment 3 is useless or ineffective when an improvement of environment is not advanced by the operation of the room environment improving equipment 3 or when the environment is made rather worse by the operation of the room environment improving equipment 3.

Embodiment 2

Figure 5:
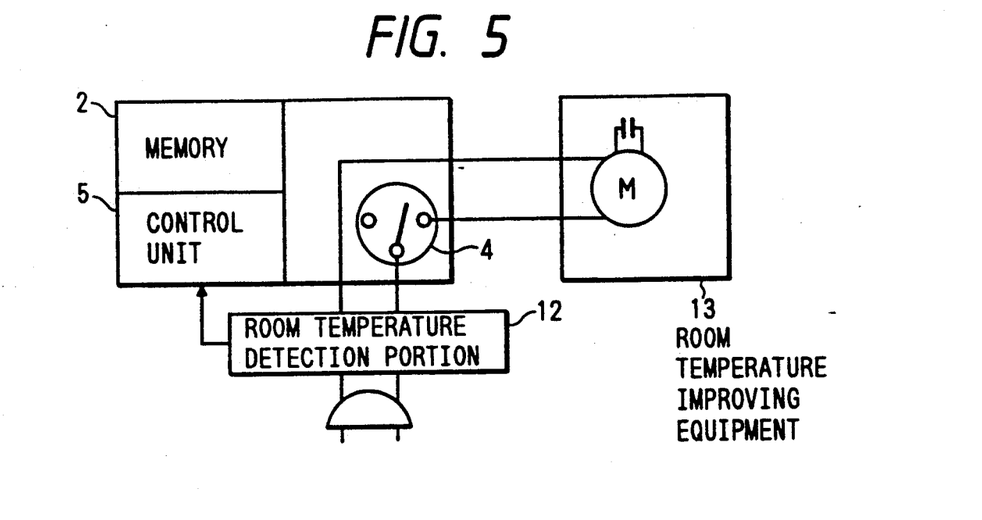
FIG. 5 is a block diagram showing the automatic room environment controller according to second embodiment.
Figure 6:
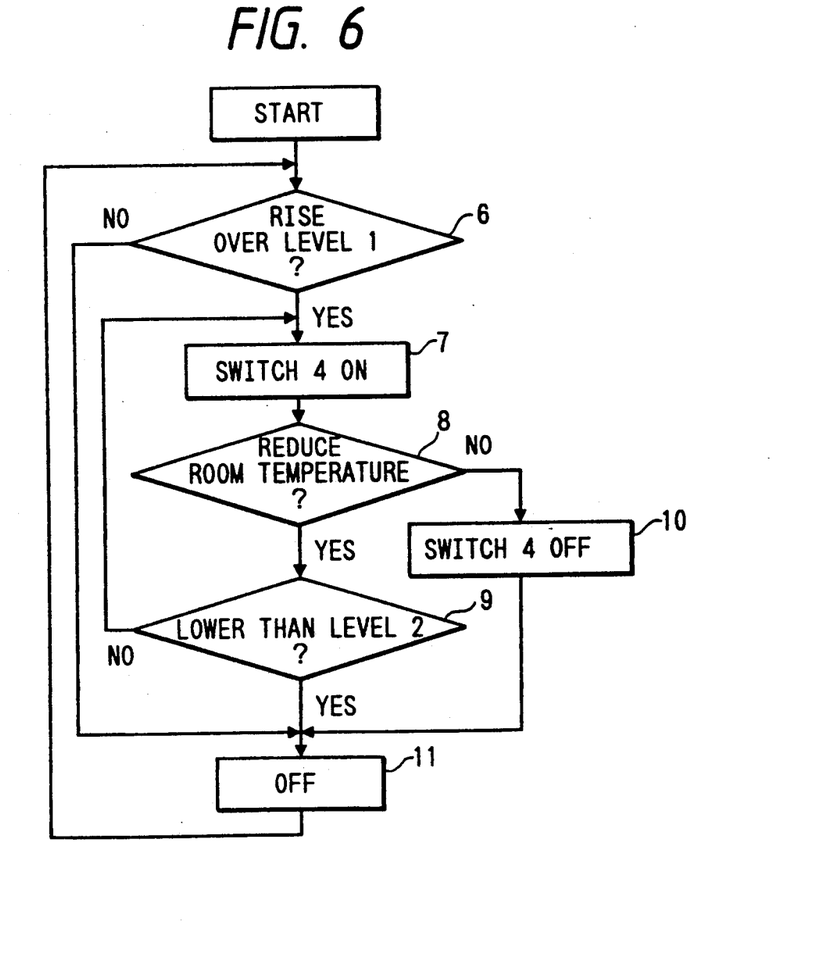
FIG. 6 is a flowchart showing the program for the control portion according to second embodiment.
Figure 7:
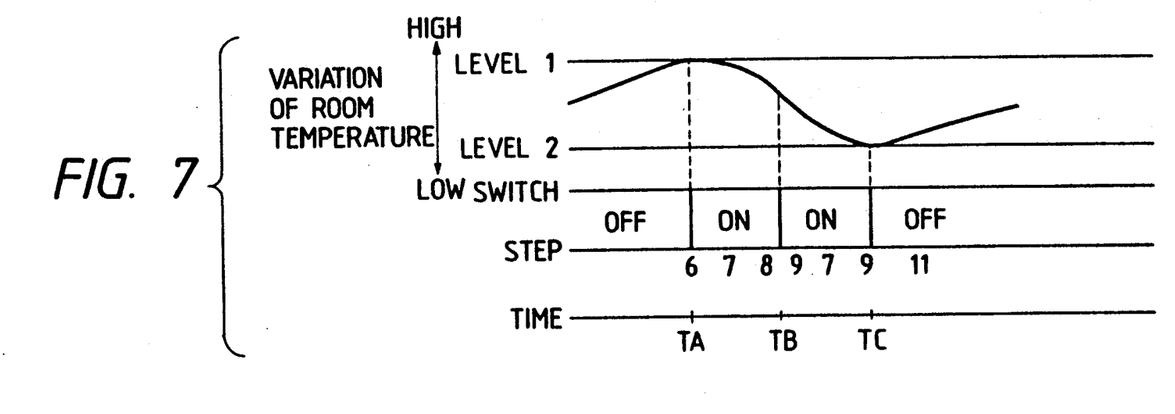
FIG. 7 is a time chart showing the operation of the controller according to second embodiment.
Figure 8:
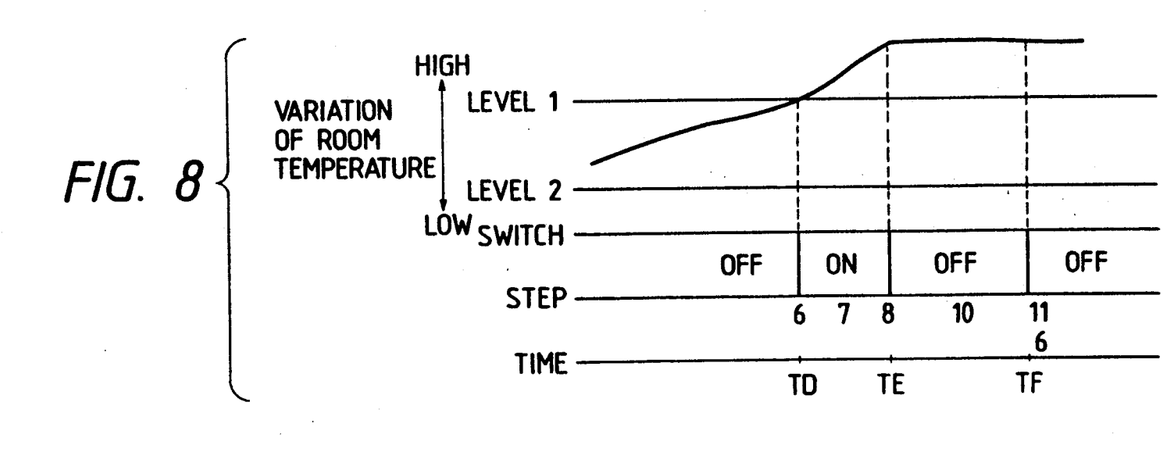
FIG. 8 is a time chart showing the operation of the controller according to second embodiment.

FIGS. 5 through 8 show an embodiment 2 of the present invention. FIG. 5 is a block diagram showing an automatic room temperature controller, FIG. 6 is a flow chart showing the program for a control portion, and FIGS. 7 and 8 are time charts showing examples of the operation of the automatic room temperature controller.

The automatic room temperature controller according to this embodiment shown in the drawings is constituted by a room temperature detection portion 12 for detecting room temperature and for quantifying the detected value as the quantity of condition to output thereof; a memory 2 for storing the room temperature thus detected; and a control portion 5 for generating a control output for room temperature improving equipment 13 so as to control the room temperature improving equipment 13 through a switch 4. For example, the room temperature detection portion 12 is apt to use a temperature sensor and the room temperature improving equipment 13 is apt to use a ventilator or the like.

The program for the control portion 5 of the automatic room temperature controller thus arrangement is executed on the basis of a flow chart shown in FIG. 6. In Step 6, it is determined whether a detected temperature of the room temperature detection portion 12 has risen beyond a set level 1 or not in summer, and if it is determined that the detected temperature has risen beyond the level 1, Step 7 is activated so that the switch 4 is turned on so as to operate the room temperature improving equipment 13. While the room temperature improving equipment 13 is operated, data stored in the memory 2 with respect to a room temperature at a period of time ago are read out, and the read-out data are compared with the data concerning the room temperature at present to thereby determine whether the room temperature tends to be lowered by the operation of the room temperature improving equipment 13 or not in Step 8. If it is determined that the temperature tends to be lowered, Step 9 is activated so that the operation of the room temperature improving equipment 13 is continued until the room temperature is lowered to a set level 2. If it is determined that the temperature is not lowered, on the contrary, the the room temperature improving equipment 13 is stopped operating for a period of time in Step 10 and the operation is returned to Step 6 through Step 11. In Step 9, it is determined whether the room temperature has been lowered to the level 2 or not, so that in the case where the room temperature has not been lowered to the level 2, step 7 is activated, and, otherwise, Step 11 is activated.

In the time chart of FIG. 7, since it is detected at TA that the room temperature has risen beyond the set level 1 in Step 6, the switch 4 is turned on for a period of time in Step 7. Then, since it is detected at TB that the room temperature has been lowered in Step 8, Step 9 is activated. Since the room temperature has not been lowered to the level 2, however, the operation is returned to Step 7 again so that the switch 4 is turned on for a period of time. Then, since the room temperature has been lowered to the level 2 at TC in Step 9, the operation is returned to Step 6 through Step 11. In the time chart of FIG. 8, since the room temperature has risen beyond the set level 1 at TD in Step 6, the switch 4 is turned on for a period of time, while since the room temperature is not lowered at TE in Step 8, the switch 4 is turned off for a period of time in Step 10. That is, the room temperature improving equipment 13 is stopped operation thereof because the operation of the room temperature improving equipment 13 is useless or ineffective when lowering of temperature is not advanced by the operation of the room temperature improving equipment 13 or when the temperature is made rather to rise by the operation of the room temperature improving equipment 13. It is needless to say that this technique can be applied also to other seasons.

Embodiment 3

Figure 9:
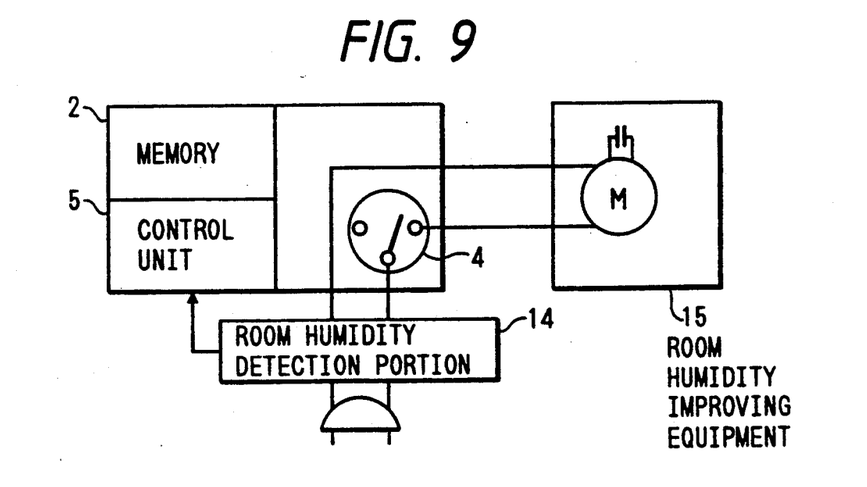
FIG. 9 is a block diagram showing the automatic room environment controller according to third embodiment.
Figure 10:
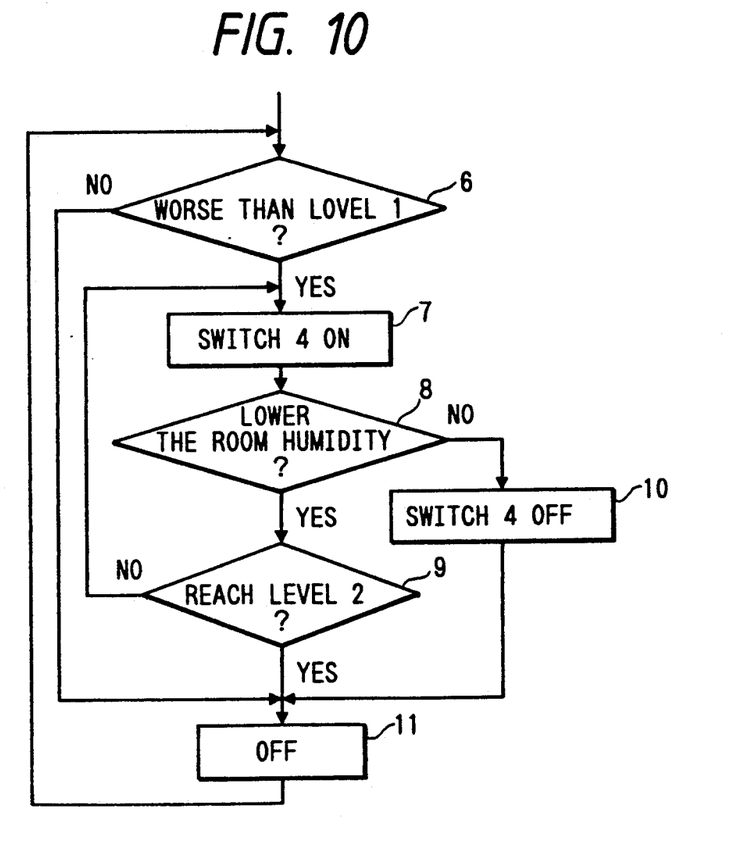
FIG. 10 is a flowchart showing the program for the control portion according to third embodiment.
Figure 11:
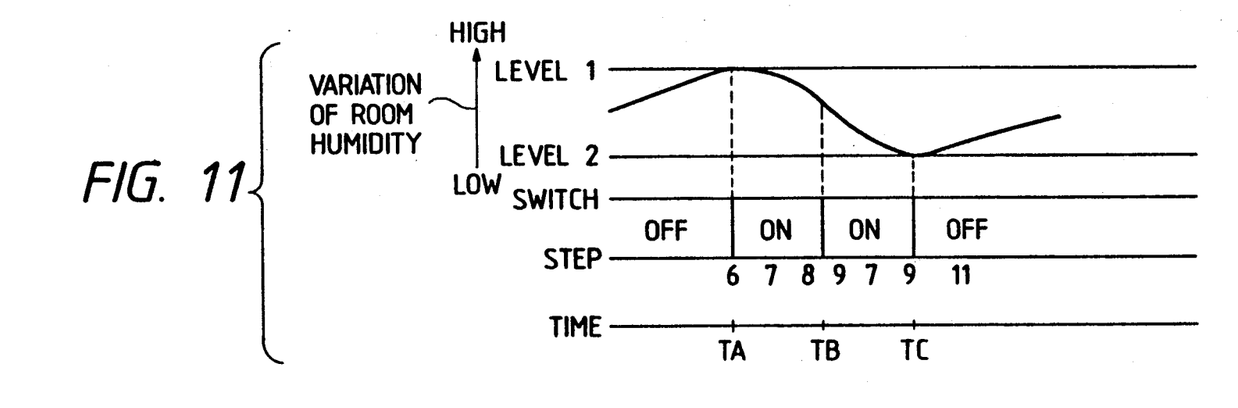
FIG. 11 is a time chart showing the operation of the controller according to third embodiment.
Figure 12:
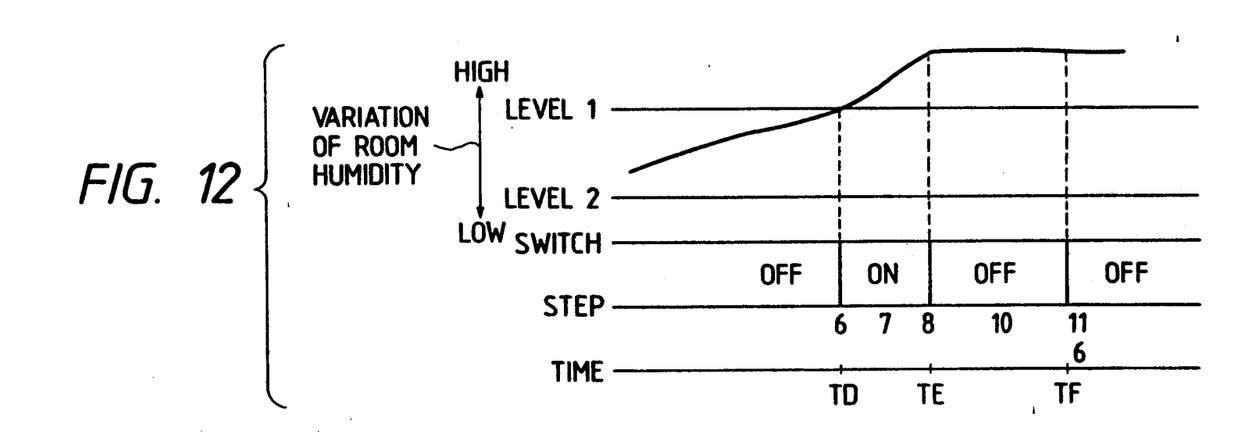
FIG. 12 is a time chart showing the operation of the controller according to third embodiment.

FIGS. 9 through 12 show an embodiment 3 of the invention. FIG. 9 is a block diagram showing an automatic room humidity controller, FIG. 10 is a flow chart showing the program for a control portion, and FIGS. 11 and 12 are time charts showing examples of the operation of the automatic room humidity controller.

The automatic room humidity controller according to this embodiment shown in the drawings is constituted by a room humidity detection portion 14 for detecting room humidity and for quantifying the detected value as the quantity of condition to output thereof; a memory 2 for storing the thus detected room humidity; and a control portion 5 for generating a control output for room humidity improving equipment 15 so as to control the room humidity improving equipment 15 through a switch 4. For example, the room humidity detection portion 14 is apt to use a humidity sensor and the room humidity improving equipment 15 is apt to use a ventilator or the like.

The program for the control portion 5 of the automatic room humidity controller thus arrangement is executed on the basis of a flow chart shown in FIG. 10. In Step 6, it is determined whether a detected humidity of the room humidity detection portion 12 has risen beyond a set level 1 or not, and if it is determined that the detected humidity has risen beyond the level 1, Step 7 is activated so that the switch 4 is turned on so as to operate the room humidity improving equipment 15. While the room humidity improving equipment 13 is operated, data stored in the memory 2 with respect to a room humidity before a predetermined time are read out, and the read-out data are compared with the data concerning the room humidity at present to thereby determine whether the room humidity tends to be lowered by the operation of the room humidity improving equipment 13 or not in step 8. If it is determined that the humidity tends to be lowered, Step 9 is activated so that the operation of the room humidity improving equipment 13 is continued until the room humidity is lowered to a set level 2. If it is determined that the humidity is not lowered, on the contrary, the the room humidity improving equipment 15 is stopped operation thereof for a period of time in Step 10 and the operation is returned to step 6 through Step 11. It is determined whether the room humidity has been lowered to the level 2 or not in Step 9, so that in the case where the room humidity has not been lowered to the level 2, Step 7 is activated, and, otherwise, Step 11 is activated.

In the time chart of FIG. 11, since it is detected at TA that the room humidity has risen beyond the set level 1 in Step 6, the switch 4 is turned on for a period of time in Step 7. Then, since it is detected at TB that the room humidity has been lowered in Step 8, Step 9 is activated. Since the room humidity has not been lowered to the level 2, however, the operation is returned to Step 7 again so that the switch 4 is turned on for a period of time. Then, since the room humidity has been lowered to the level 2 at TC in Step 9, the operation is returned to Step 6 through Step 11. In the time chart of FIG. 12, since the room humidity has risen beyond the set level 1 at TD in Step 6, the switch 4 is turned on for a period of time, while since the room humidity is not lowered at TE in Step 8, the switch 4 is turned off for a period of time in Step 10. That is, the room humidity improving equipment 15 is stopped operation thereof because the operation of the room humidity improving equipment 15 is useless or ineffective when lowering of humidity is not advanced by the operation of the room humidity improving equipment 15 or when the humidity is made rather to rise by the operation of the room humidity improving equipment 15. Further, it is needless to say that this technique can be applied also to the case where a room is in a dried condition or the like.

Embodiment 4

Figure 13:
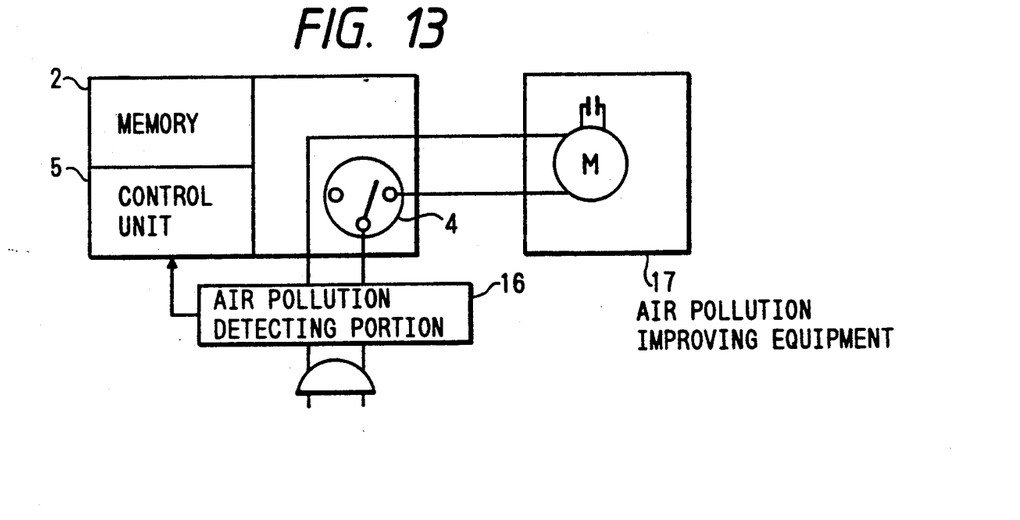
FIG. 13 is a block diagram showing the automatic room environment controller according to fourth embodiment.
Figure 14:
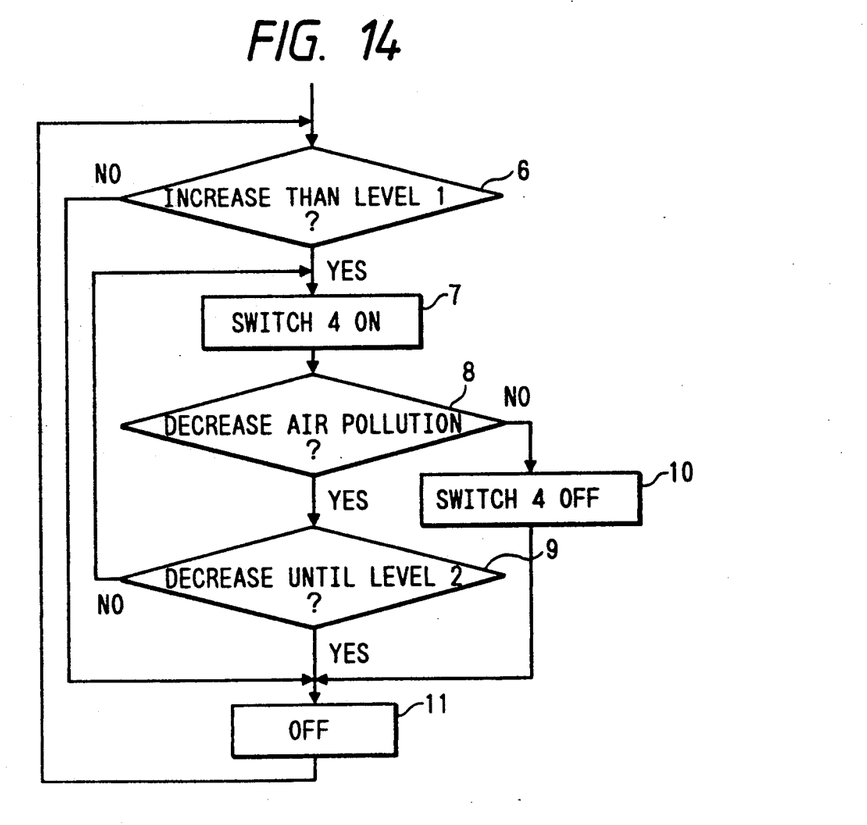
FIG. 14 is a flowchart showing the program for the control portion according to fourth embodiment.
Figure 15:
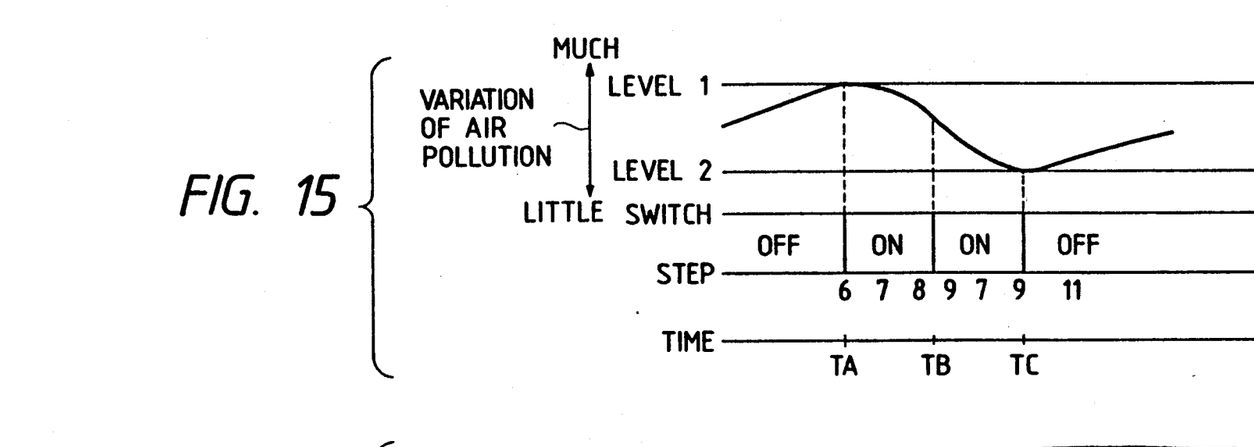
FIG. 15 is a time chart showing the operation of the controller according to fourth embodiment.
Figure 16:
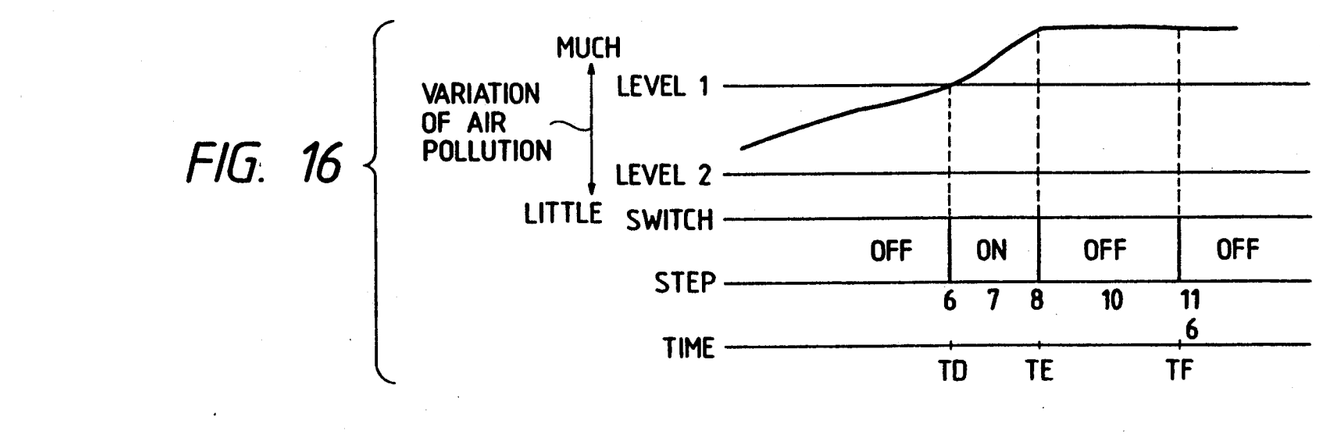
FIG. 16 is a time chart showing the operation of the controller according to fourth embodiment.

FIGS. 13 through 16 show an embodiment of the invention. FIG. 13 is a block diagram showing an automatic air pollution controller, FIG. 14 is a flow chart showing the program for a control portion, and FIGS. 15 and 16 are time charts showing examples of the operation of the automatic air pollution controller.

The automatic room air pollution controller according to this embodiment shown in the drawings is constituted by a room air pollution detection portion 16 for detecting room air pollution and for quantifying the detected value as the quantity of condition to output thereof; a memory 2 for storing the room air pollution thus detected; and a control portion 5 for generating a control output for room air pollution improving equipment 17 so as to control the room air pollution improving equipment 1 through a switch 4. For example, the room air pollution detection portion 16 is apt to use any gas sensor and the room air pollution improving equipment 17 is apt to use a ventilator or the like.

The program for the control portion 5 of the automatic room air pollution controller thus arrangement is executed on the basis of a flow chart shown in FIG. 14. In Step 6, it is determined whether a detected air pollution of the room air pollution detection portion 16 has increased more than a set level 1 or not, and if it is determined that the detected air pollution exceeds the level 1, Step 7 is activated so that the switch 4 is turned on so as to operate the room air pollution improving equipment 17. While the room air pollution improving equipment 17 is operated, data stored in the memory 2 with respect to a room air pollution at a period of time ago are read out, and the read-out data are compared with the data concerning the room air pollution at present to thereby determine whether the room air pollution tends to be decreased by the operation of the room air pollution improving equipment 17 or not in Step 8. If it is determined that the air pollution tends to be decreased, Step 9 is activated so that the operation of the room air pollution improving equipment 17 is continued until the room air pollution is decreased to a set level 2. If it is determined that the air pollution is not decreased, on the contrary, the the room air pollution improving equipment 17 is stopped operation thereof for a period of time in Step 10 and the operation is returned to Step 6 through Step 11. In Step 9, it is determined whether the room air pollution has been lowered to the level 2 or not, so that in the case where the room air pollution has not been decreased to the level 2, the operation is back to Step 7, and, otherwise, Step 11 is activated.

In the time chart of FIG. 15, since it is detected at TA that the room air pollution exceeds the set level 1 in Step 6, the switch 4 is turned on for a period of time in Step 7. Then, since it is detected at TB that the room air pollution has been decreased in Step 8, Step 9 is activated. Since the room air pollution has not been lowered to the level 2, however, the operation is returned to Step 7 again so that the switch 4 is turned on for a period of time. Then, since the room air pollution has been lowered to the level 2 at TC in Step 9, the operation is returned to Step 6 through Step 11. In the time chart of FIG. 16, since the room air pollution exceeds the set level 1 at TD in Step 6, the switch 4 is turned on for a period of time, while since the room air pollution is not lowered at TE in Step 8, the switch 4 is turned off for a period of time in Step 10. That is, the room air pollution improving equipment 17 is stopped operation thereof because the operation of the room air pollution improving equipment 17 is useless or ineffective when lowering of air pollution is not advanced by the operation of the room air pollution improving equipment 17 or when the air pollution is made rather to rise by the operation of the room air pollution improving equipment 17. Further, it is needless to say that this technique can be applied also to the case where a room is in a dried condition or the like.

As seen from the foregoing explanation of the embodiments, according to the present invention, when the detected value of room environment detected by the environment detection portion become worse than a set level, the room environment improving equipment is operated to thereby try an improvement of the room environment. When the environment is not improved even by the continuous operation of the room environment improving equipment, the operation of the room environment improving equipment is stopped for the period of time. Consequently, the room environment improving equipment according to the invention prevents an useless or obstructive operation for an improvement of room environment and therefore an effective improvement of the room environment can be realized.

What is claimed is:

1. An automatic room environment controller, comprising:
    means for detecting condition of room environment;
    improving means for improving the condition of the room environment;
    first means for comparing a value of the condition previously detected by said detecting means with a first predetermined value to determine whether operation of said improving means is necessary or not, so that the operation of said improving means is continued until the condition is improved to said first predetermined value when the necessity of the operation of said improving means;
    second means for comparing a value of the condition detected at present by said detecting means with the previously detected value of the condition to determine whether the condition corresponding to the value detected at present is improved than the condition corresponding to the previously detected value or not, when the condition corresponding to the value detected at present is not improved, to stop the operation of the improving means.

2. A controller according to claim 1, further comprising third means for comparing the value detected at present of the condition detected by said detecting means with a second predetermined value of the condition to determine whether operation of said improving means is necessary or not, when the value detected at present exceeds the second predetermined value, to stop the operation of the improving means.

3. A controller according to claim 1, in which said value detected at present is detected for a period of time after detecting said previously detected value.

4. A controller according to claim 1, in which said detecting means comprises means for detecting temperature as a condition in the room environment; said improving means comprises ventilation means for ventilating air in the room to improve the temperature in the room.

5. A controller according to claim 1, in which said detecting means comprises means for detecting humidity as a condition in the room environment; said improving means comprises ventilation means for ventilating air in the room to improve the humidity in the room.

6. A controller according to claim 1, in which said detecting means comprises means for detecting air pollution as a condition in the room environment; said improving means comprises ventilation means for ventilating air in the room to improve the air pollution in the room.

7. An apparatus for automatically controlling room environment, comprising:
    means for improving the room environment;
    means for detecting a condition of the room environment to output a detection result;
    means for storing said detection result from said detecting means;
    first comparison means for comparing said detection result with a first preset level;
    second comparison means for comparing said detection result detected at present with said detection result detected before a predetermined period of time; and
    control means for controlling said improving means to be operative when said detection result is lower than said first preset level during inoperation of said improving means, to be kept operative until said detection result reaches a second preset level when said detection signal detected before said predetermined period of time is lower than said detection signal detected at present during operation of said improving means, and to be inoperative for a predetermined period of time when said detection result detected before said predetermined period of time is equal to or higher than said detection result detected at present during operation of said improving means.

8. A controller as claimed in claim 7, wherein said improving means comprises a ventilator.

9. A controller as claimed in claim 8, wherein said detecting means detects a room temperature as the room environment.

10. A controller as claimed in claim 8, wherein said detecting means detects a room humidity as the room environment.

11. A controller as claimed in claim 8, wherein said detecting means detects an air pollution as the room environment.

* * * * *